United States Patent [19]

Montabert

[11] Patent Number: 4,601,000
[45] Date of Patent: Jul. 15, 1986

[54] ELECTROHYDRAULIC CONTROL SYSTEM FOR A ROCKDRILL ASSEMBLY

[75] Inventor: Roger Montabert, Lyons, France

[73] Assignee: Etablissements Montaberg, Societe Anonyme, Saint Priest, France

[21] Appl. No.: 456,385

[22] Filed: Jan. 7, 1983

[30] Foreign Application Priority Data

Jan. 11, 1982 [FR] France ................ 82 00648

[51] Int. Cl.[4] .............................. B25J 11/00
[52] U.S. Cl. ..................... 364/513; 173/11; 173/43; 901/9; 901/15; 901/22
[58] Field of Search ........ 364/513, 815, 817; 414/718, 730; 901/9, 15, 18, 22, 41; 173/4, 11, 43

[56] References Cited

U.S. PATENT DOCUMENTS

| 3,845,284 | 10/1974 | Taguchi et al. | 901/9 X |
| 3,896,885 | 7/1975 | Dahlstrom et al. | 173/43 X |
| 4,076,131 | 2/1978 | Dahlstrom et al. | 901/9 X |
| 4,113,033 | 9/1978 | Lindbald | 901/9 X |
| 4,156,835 | 5/1979 | Whitney et al. | 364/513 X |
| 4,229,136 | 10/1980 | Panissidi | 414/730 X |
| 4,230,189 | 5/1980 | Mashimo | 173/4 |
| 4,240,511 | 12/1980 | Mashimo | 173/43 X |
| 4,260,941 | 4/1981 | Engelberger et al. | 901/9 X |
| 4,267,892 | 5/1981 | Mayer | 173/43 |
| 4,335,443 | 6/1982 | Dickey | 364/817 X |
| 4,343,367 | 8/1982 | Mashimo | 173/43 |
| 4,364,540 | 12/1982 | Montabert | 248/654 |
| 4,403,281 | 9/1983 | Holmes et al. | 414/730 X |
| 4,410,049 | 10/1983 | Molin | 901/9 X |
| 4,498,544 | 2/1985 | Molin | 173/43 X |
| 4,514,796 | 4/1985 | Saulters et al. | 364/513 X |

Primary Examiner—Errol A. Krass
Assistant Examiner—Edward R. Cosimano
Attorney, Agent, or Firm—Karl F. Ross; Herbert Dubno

[57] ABSTRACT

An electrohydraulic control system for an arm assembly of the type described in U.S. Pat. No. 4,364,540 utilizes an electric computer (microprocessor) which receives a nonlinear or harmonic signal from the rotary hydraulic motor of the arm of this assembly and converts the harmonic signal into a linear signal which is applied to a comparator as the value signal for comparison with a command signal from the computer. Similar comparators are provided for each of the hydraulic operators and the sensors thereof can provide direct actual value inputs to these comparators.

4 Claims, 3 Drawing Figures

ELECTROHYDRAULIC CONTROL SYSTEM FOR A ROCKDRILL ASSEMBLY

FIELD OF THE INVENTION

The present invention relates to an electrohydraulic control system for a rockdrill arm assembly, especially for drilling holes into the advancing front of a mine gallery or other subterranean structure. More particularly, the invention is an improved electrohydraulic control system for a support-arm system of the type described in the U.S. Pat. No. 4,364,540 issued upon application Ser. No. 133,829 filed Mar. 25, 1980.

BACKGROUND OF THE INVENTION

My above-mentioned U.S. patent, which is based upon a French application which matured into French Pat. No. 2,452,587, discloses a support-arm assembly for a rockdrill especially suitable for use in subterranean operation, e.g. for drilling into the face of a mine gallery or tunnel as to advance the gallery or tunnel. Obviously, such systems are usable wherever a multiplicity of holes must be bored in rock or like structures, e.g. for the placement of explosives or simply to weaken the wall.

That assembly comprised a rail carrying a drilling head and means for displacing the head on the rail to drive the drill bit into the subterranean structure.

Since orientation of the rail in practically any direction is essential for versatility of the apparatus, that system comprised a base pivot or support which could rotate about a substantially vertical axis, a first hydraulic operator adapted to rotate the support or post about this axis, an arm articulated on this support for swinging movement about a substantially horizontal axis, a second hydraulic operator for swinging the arm, a support member on the arm rotatable about the longitudinal axis generally parallel to the arm, a third hydraulic operator for this latter means, and a cradle carrying the rail, pivotally mounted on the latter member, and a fourth hydraulic operator for tilting this cradle and hence the rail relative to the arm. Means was provided to control the respective operators so that the rail remains essentially parallel to itself for movement of the drill head into the various drilling positions.

In addition to the four movements described, which were effected by rotary hydraulic motors or hydraulic piston and cylinder arrangements forming the hydraulic operators, at least a fifth movement was provided by making the arm telescopically extensible by a fifth hydraulic operator such as a hydraulic piston and cylinder arrangement. This latter movement, however, does not have any effect upon the orientation of the rail although it is used to position it with respect to the subterranean structure which is to be drilled.

While this system was highly effective for most purposes, problems were encountered when, for example, it was desired to drill holes which converged or diverged, i.e. were not strictly parallel. In this case, automatic position compensation from hole to hole was not available and the holes had to be manually controlled which led to inaccurate drilling and inconveniences.

The earlier systems, moreover, which were provided with hydraulic correction only to a limited degree, were sometimes lacking in precision and thus did not provide suitable performance in many cases.

A third disadvantage was that the sensor of the rotary movement, i.e. the rotation of the cradle-carrying support member about the longitudinal axis of the arm, required rotary linear-output sensors which were rare and not always available.

Finally, it was not possible to provide fully automatic control of the drilling operation in accordance with, for example, a firing plan whereby a predetermined pattern of holes could be drilled in predetermined relationship and at the same time provide full manual control and positioning. It was especially difficult with the earlier system to manually position the rail at a desired location for initiating a sequence of automatic operations.

OBJECTS OF THE INVENTION

It is, therefore, the principal object of the present invention to provide an electrohydraulic control system for a support-arm assembly of the class described which obviates the aforementioned disadvantages and, in particular, represents an improvement over the system of the aforementioned patents.

A more specific object of this invention is to provide a control system for a drilling assembly and especially a drilling assembly having an arm positionable by the means described, so that it is capable of automatically executing a sequence of drilling operations and forming a series of holes in accordance with a predetermined program, referred to herein as a firing plan, in a truly automatic manner.

Another object of the invention is to provide a system which has improved hole drilling precision and performance by comparison with earlier similar systems.

Still another object of the invention is to provide an electrohydraulic system which allows the use of nonlinear sensors where these are most efficient and thus eliminates the need to search for linear-output sensors for essentially nonlinear movements.

Finally, it is an object of the invention to provide a system which permits switch-over between automatic and manual functioning or modes of operation without the need for hydraulic or potentiometric switch-over units.

SUMMARY OF THE INVENTION

These objects are attained, in accordance with the present invention, in a support-arm assembly of the type described which is provided with an electrohydraulic control system comprising an electronic computer connected to a selector for firing programs, i.e. predetermined plans or layouts of drilling, and adapted to respond to the sensors providing position parameters corresponding to the four main movements of the assembly, not only to determine the third and fourth parameters in accordance with the second and third parameters, but also to control the displacement and positioning of the rail for the various positions defined by the program or plan.

According to the invention, moreover, the computer provides for the various movements of the assembly, electrical command signals which are delivered by the command circuits respectively to electronic correction circuits, operating in an analog or numerical mode and which also can receive signals from the respective sensors so that these actual value signals representing the instantaneous position can be compared with the reference signals or command signals outputted by the computer to generate error signals or the like which operate servovalves controlling the hydraulic operators.

The system of the invention can thus make use of electronic means, namely, a microprocessor, which permits preprogramming the system with a sequence of automatic functions for drilling according to the plan or program, whether or not the machine is disposed exactly along the axis of the gallery or tunnel.

For each movement, the control system utilizes a closed loop electronic correction capable of providing precise positioning of each controlled part. The response may be a result of a study of the response-controlled element following harmonic analysis and by remodeling to ensure the appropriate correction at each position or orientation.

In the case of the assembly of the invention where the orientation of the rail is defined by four angular parameters of which the last two can be deduced from the first two if parallelity is to be assured, the microprocessor permits programming the latter two angles from the first two parameters and, accordingly, control of the second two movements by the calculated results. When, however, the machine may be offset from the axis of the tunnel or gallery, by simply positioning the rail along the axis, e.g. by displacement of the system in a manual mode, it is possible to utilize previous values of the last two parameters (angles) to reestablish values for the first two angles utilizing the microprocessor.

The boring machine of the type with which the present invention is concerned, in which the orientation of the head is determined by the orientation of the rail, thus has the orientation of the rail by the two first parameters programmed to provide the shortest path from one point to another. The microprocessor calculates the two other angular parameters and, if necessary, the telescoping movement can be introduced as a simple translation of the axis. The operator is able to select one or another firing plan or program simply by actuating a control panel and switches thereof.

A supplemental function of the computer, namely, the microprocessor alone or with appropriate analog/digital and digital/analog conversion, is to permit the use of nonlinear sensors, and especially a sensor capable of delivering a sinusoidal or cosine output proportional to the angle of rotation as the free end of the arm, for example, is rotatable through 360° about the longitudinal axis thereof. This signal is converted by the microprocessor into a linearly varying signal so that the computer can then operate upon a signal which is a linear function of the angle of rotation to produce an output which is applied to the command circuit for the rotary motor.

For the other movements where the amplitude is relatively small, the sensors may provide sinusoidally varying or cosine signals in proportion to the angular displacements.

Here, however, the sine or cosine curve so closely approximates a linear function as to make it unnecessary to utilize the capacity of the microprocessor to transform the harmonically varying signals to a linear signal.

The electronic correction circuits carry electrohydraulic units of the so-called "servodistributor type" which may be mounted directly upon the hydraulic operators, i.e. cylinders or rotary motors.

Such servodistributors are highly effective for use in a closed loop control system of the type of the present invention since low level electrical signals need to be processed from the sensors or outputted by the computer or other circuits to actuate such servodistributors. The complex hydraulic circuitry hitherto used for control purposes can be eliminated.

According to another feature of the invention, an electric switch capable of switching over between manual and automatic operating modes is connected directly to an input to the computer and inputs are also provided for "all-or-none" electric manipulators adapted to bring about manual positioning of the respective operators in the manual switch position.

The manual operating mode is thus selected without any hydraulic or potentiometric device utilizing only the computer.

The computer outputs resulting from operation of the manipulators is thus supplied to the respective servomechanisms by the computer through the correction circuits for resetting the drill head.

Thus I provide an electrohydraulic control system for a support arm assembly which comprises:

a base support angularly displaceable about a substantially upright first axis;

a first hydraulic operator connected to the base support for angularly displacing same about the first axis through an angle $\alpha 1$;

an arm pivotally mounted on the base support and swingable thereon about a second axis substantially perpendicular to the first axis, the arm having a longitudinal third axis substantially perpendicular to the second axis;

a second hydraulic operator connected to the arm for angularly displacing same about the second axis through an angle $\alpha 2$;

a support member on the arm angularly displaceable about the third axis;

a third hydraulic operator on the arm connected to the member for angularly displacing the member about the third axis through an angle $\alpha 3$;

a tool-guiding rail pivotally mounted on the member for tilting movement about a fourth axis substantially perpendicular to the third axis; and a fourth hydraulic operator connected to the rail for tilting same about the fourth axis through an angler $\alpha 4$.

According to the invention this system comprises in combination:

first, second, third and fourth sensors responsive respectively to angular displacements $\alpha 1$, $\alpha 2$, $\alpha 3$ and $\alpha 4$ for generating respective electrical signals representing these angular displacements;

an electronic computer connected to each of the sensors individually for individually receiving the signals and processing same to provide:

(a) third and fourth output signals determining the angular displacements $\alpha 3$ and $\alpha 4$ to be generated by the third and fourth operators to maintain the rail parallel to itself upon positioning of the rail at a number of different locations for tool operations in response to first and second output signals corresponding to the angular displacements $\alpha 1$ and $\alpha 2$, and (b) generating respective command signals Ve1, Ve2, Ve3 and Ve4 for each of said first, second, third and fourth operators upon the initiation of a programmed sequence of movements of the rail controlled by the computer for successive operations of a tool on the rail in successive locations thereof, programming means for selecting from a number of such programmed sequences a predetermined sequence for applying a predetermined plan of locations for successive tool operations to the computer, and respective electronic correction circuits between the respective outputs of the computer and each of the operators for controlling same by comparing signals representing the angular displacements $\alpha 1$, $\alpha 2$, $\alpha 3$ and $\alpha 4$ and thus the actual positions generated by the operators with command signals Ve1, Ve2, Ve3 and Ve4 from the computer, whereby each of the operators is controlled at least in part in consideration of forces on the assembly at each location.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
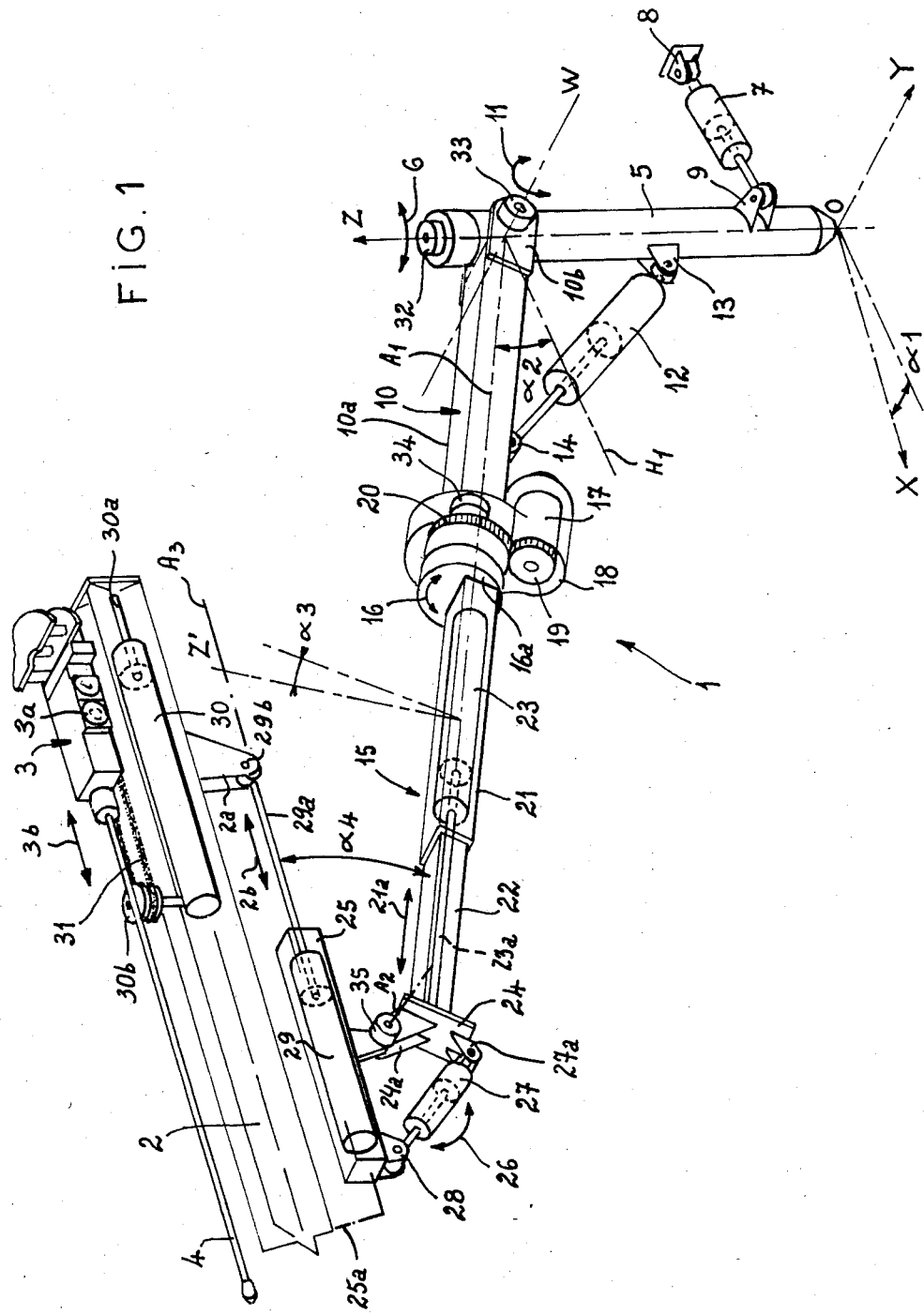
FIG. 1 is a perspective view of a support arm assembly according to the invention which is provided with the control means.

FIG. 1 of the drawing illustrates a support arm assembly for a drill and especially a rockdrill for subterranean applications shown highly diagrammatically and preferably of a type described in my U.S. Pat. No. 4,364,540 with at least the degrees of movement of the various elements described in this patent and the mechanisms for the same.

The drill assembly which is mounted upon the drill carriage may be any conventional rockdrill head capable of advancing a boring bit into the rock of the subterranean structure and for rotating or reciprocating this bit to achieve penetration thereof.

The various hydraulic operators which are specifically described may be replaced by equivalently operating fluid systems such that, for example, a hydraulic cylinder, which lifts the arm against the force of gravity, may be replaced by a hydraulic motor which is normally extended by the force of gravity and contracted to shift the actuated member against this force.

Furthermore, the entire assembly can be mounted upon a vehicle, car or track system for enabling it to be shifted in the subterranean cavern, e.g. a mine or tunnel, and this transporter may likewise be controlled by the programmed control means of the instant invention for automatic boring operations.

More particularly, FIG. 1 shows a support arm assembly which is represented at 1 and comprises a guide rail 2 along which a drill head 3 is displaceable. The guide rail 2 thus forms a rectilinear path for the drill head which carries a drill bit 4 rotatable about its axis by a motor $3a$ in this head.

The support arm assembly 1 is mounted upon a chassis (not shown) which can carry the assembly within the tunnel and is provided with an engine which can drive a hydraulic pump for supplying the various hydraulic operators or motors of the arm and, if desired, generating any electrical power which may be required.

While this chassis has not been shown, the axes OX, OY and OZ, which have their origins at the pivot point O between the arm assembly and the chassis, have been illustrated.

The plane of the chassis is thus the plane defined between the mutually perpendicular horizontal axes OX and OY.

The horizontal axis OX can be assumed to represent a direction parallel to the direction of travel of the support vehicle and hence a direction parallel to the longitudinal axis of the gallery or tunnel, a wall of which is to be pierced by the rockdrill in preparation for the insertion of explosive charges.

The drill rail 2 can be positioned parallel to the axis OX and maintained in this parallel orientation for the drilling of a succession of holes in the face of the tunnel, at least in so far as the basic operational mode of the system is concerned. In some cases, inclinations to the axis OX are desirable as will be discussed.

The support arm assembly comprises a first part or post 5 which can be referred to also as a base pivot whose lower end is articulate on a pedestal (see U.S. Pat. No. 4,364,540) by a universal joint which may be constituted by a wall and socket assembly and defining the origin O of the axes.

This post 5 is rotatable about its axis OZ which is a vertical axis when the post is upright, i.e. has not been tilted about either of the horizontal axes OX or OY or about any other horizontal axis. The angular displacement of the post 5 about its axis OZ is represented by the two-headed arrow 6 and can have a dimension $\alpha 1$. This angular displacement is effected by a hydraulic cylinder 7 which has one end pivotally connected at 8 to a point affixed with respect to the origin O but able to tilt with the arm 5 about the axes OX and OY to achieve the additional mobility provided by the cylinders 52 and 53 of U.S. Pat. No. 4,364,540.

The piston rod of this cylinder 7 is connected pivotally to the lugs 9 projecting laterally from the post 5. Thus contraction of the cylinder 7 will result in a rotation of the post 5 about its axis OZ in the counterclockwise sense as seen from above while extension of the cylinder will result in rotation of the post in the clockwise sense.

It will be appreciated that in this case and in the cases of the hydraulic cylinders described below, reversal of the orientation of the cylinder arrangement is also possible, i.e. the piston rod can be articulated to a fixed point and the cylinder body articulated to the angularly displaceable member. Further it is possible to provide the cylinder arrangement with two pistons having respective rods pivotally connected to the fixed point and to the angularly displaceable member respectively. All of these variants are thus included within the description of the piston-and-cylinder arrangements simply as hydraulic cylinders.

The angle through which the cylinder 7 rotates the post 5 can be described as the angle, already identified at $\alpha 1$ between the projection of the arm on the plane XOY and the OX axis.

The arm is swingable about a horizontal axis W at an upper portion of the post 5. The arm has been designated generally at 10 and comprises a first arm member $10a$ connected by a pivot joint $10b$ to the post 5.

The pivotal movement of the member $10a$ about the axis W represented by the double-headed arrow 11 is controlled by a hydraulic cylinder 12 which can be referred to as the levator cylinder and is pivotally connected to lugs 13 of the post 5 and to lugs 14 of the underside of member $10a$. The member $10a$ can be swung through, for example, an angle $\alpha 2$ defined between a horizontal axis $H_1$ and the axis $A_1$ of member $10a$. The axis $A_1$ is of course the longitudinal axis and the angle it makes with the horizontal plane defined by the axes W and $H_1$ is the angle $\alpha 2$.

The arm 10 also comprises a forearm member 15 which can carry a head for rotating the drill head above the longitudinal axis $A_1$ or can itself be rotated by means shown in FIG. 1 to achieve a similar result. In this case, the forearm member 15 is not telescopically extendable as it is in U.S. Pat. No. 4,364,540 but is angularly displaceable about the axis $A_1$ as represented by the double-headed arrow 16 and is carried by a head 16a which is driven by a gear 20 from a pinion 19 of a motor 17 in the head 18 affixed to the free end of the arm member 10a. The motor 17 is a hydraulic motor and is received in the housing of the head 18 while being able to rotate the arm member 15 through 360°. The angular displacement of this arm member 15 about the axis $A_1$ relative to a perpendicular Z' to this axis and lying in a vertical plane, is represented at $\alpha3$.

The forearm 15 is itself formed of two elements 21 and 22 forming a telescopingly extensible structure, the distal element 22 sliding in the proximal element 21 as represented by the double-head arrow 21a.

The effective length of the forearm 15 is thus adjustable or variable by means of a hydraulic cylinder 23 shown only schematically and having, for example, a piston rod 23a connected to a support plate 24 at the leading end of member 22. The members 10a, 21 and 22 are all shown to be of polygonal cross section to be more readily able to resist torque.

The support plate 24 forms a base upon which is pivotally mounted a cradle 25 formed with a hydraulic cylinder 29 which is able to swing angularly in lugs 24a about the pivotal axis $A_2$ through an angle $\alpha4$ under the control of a hydraulic cylinder 27 which can be described as a tilting cylinder.

The hydraulic cylinder 27 can swing the cradle as represented by the double-headed arrow 26 in the plane of the arms 10, 15 and the angle $\alpha4$ is measured as the angle included between the axis $A_1$ and an axis $A_3$ of the cylinder 29 in cradle 25 parallel to the rail 2.

The cylinder 27 is pivotally connected at 27a to the support plate 24 and has its piston rod pivotally connected to the lugs 28 of the cradle 25. One side of this cradle is shown to carry the rail 2 by dot-dash line 25a while the other side carries the rail via a cylinder system.

This cylinder system comprises the hydraulic cylinder 29 which is mounted in the cradle 25 and has a piston rod 29a pivotally connected at 29b to lugs 2a extending downwardly from the rail 2. When the hydraulic cylinder extends, therefore, the rail 2 is retracted to the right (FIG. 1) and when cylinder 29 contracts the rail 2 is displaced to the left.

The positioning cylinder 29, therefore, is capable of displacing the rail longitudinally as represented by the double-headed arrow 2b.

The rail 2 itself is provided with a cylinder 30 whose piston rod 30a is affixed to the rail while the cylinder body carries a sprocket wheel 30b around which a chain 31 passes. This chain has one end fixed to the rail and another end engaged by the drilling head 3 so that, by displacement of the cylinder 30 against, for example, a retracting spring force, the head 3 can be displaced as represented by the double-headed arrow 3b longitudinally to perform the drilling maneuver. This movement is effected in a direction perpendicular to the plane YOZ which is also a plane parallel to the plane of the face of the tunnel to be drilled.

All of the orientations of the rail 2 correspond to predetermined values of the four angles $\alpha1$, $\alpha2$, $\alpha3$ and $\alpha4$ which are detected by respective angle sensors 32, 33, 34 and 35. Such angular displacement sensors may be of the type described at page 7 of *Servomechanism Practice*, McGraw-Hill Book Co., New York, 1960. The telescoping movement can be disregarded for the moment and its control only provides another means of approximating the drill to the location at which the hole is to be bored.

If the movement of the rail 2 is such that the rail is to remain parallel to the axis OX, these four angles are related by the following three equations:

$$\cos\alpha4 = \cos\alpha1 \cdot \cos\alpha2 \quad (I)$$

$$\operatorname{tg}\alpha3 = \frac{-\operatorname{tg}\alpha1}{\sin\alpha2} \quad (II)$$

$$\sin\alpha3 = \frac{\sin\alpha1}{\sin\alpha4} \quad (III)$$

These relationships are given in terms of trigonometric functions of the four angles.

Figure 2:
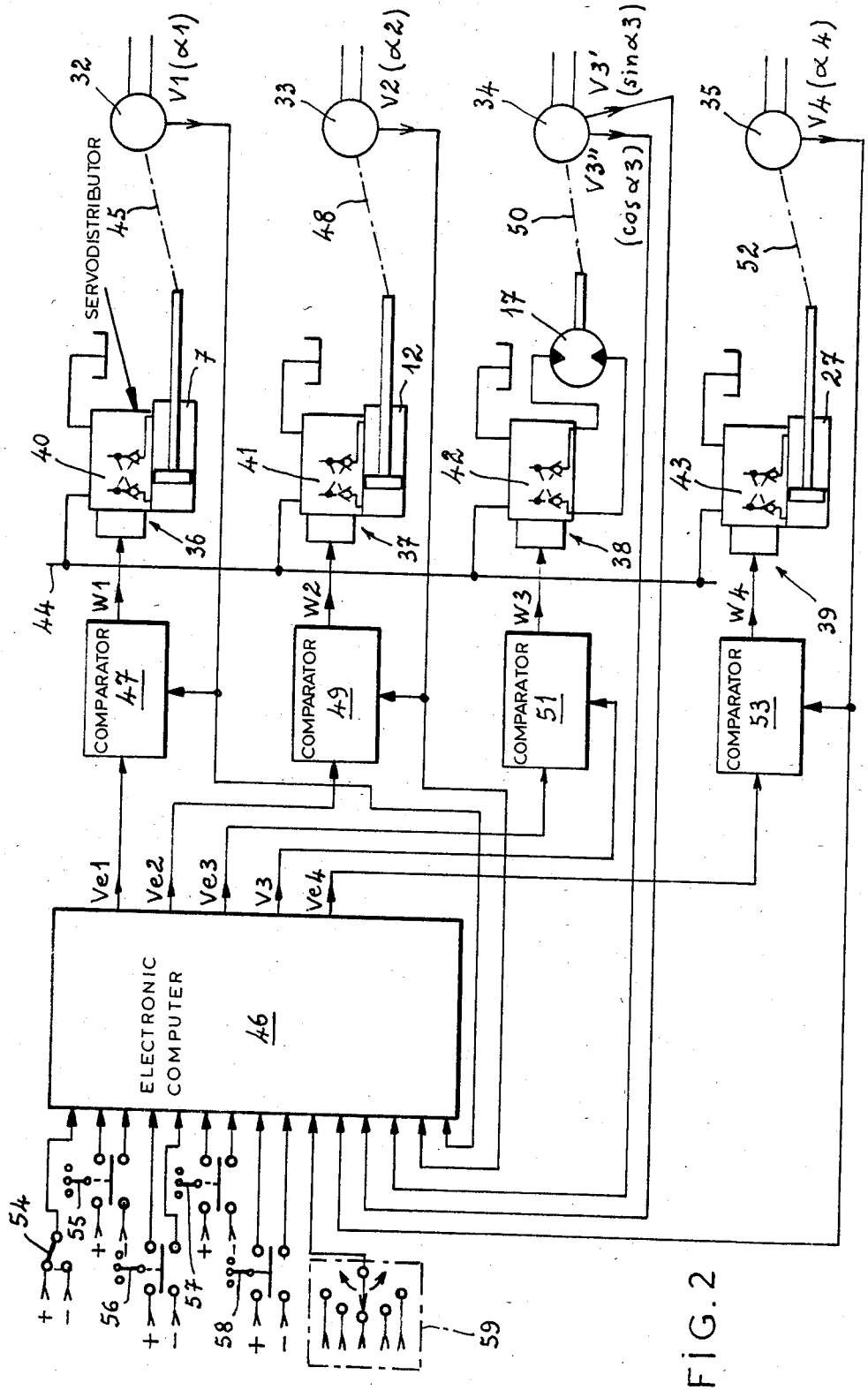
FIG. 2 is a block diagram of the control means for this arm and especially for the electrohydraulic units thereof.

From these relations it can be seen that, if the values of two angles $\alpha1$ and $\alpha2$ are known, it is possible to calculate from them the two other angles $\alpha3$ and $\alpha4$ using for example equations I and II. An algorithm to this effect is provided automatically in the electrohydraulic control system shown in FIG. 2.

In this figure, the hydraulic cylinders 7, 12 and 27 and the hydraulic motor 17, previously described, have been illustrated. Each of these hydraulic operators is associated with a respective servocontrol valve. For example, the operator 7 is provided with the servocontrol valve 36, the operator 12 with the servocontrol valve 37, the operator 17 with the servocontrol valve 38 and the operator 27 with the servocontrol valve 39. The servocontrol valves are connected with the operators slaved to them by respective check valves. Hydraulic servomechanisms of this type are described at pages 395 through 422 of the *Servomechanism Practice*, op. cit.

The check valves for the servocontrol valves 36, 37, 38 and 39 are represented respectively at 40, 41, 42 and 43. The hydraulic fluid source for delivering the fluid under pressure to the operators is represented at 44.

The sensor 32 disposed, for example, at the top of the post 5, is provided with a mechanical link represented at 45 with the member displaced by the pivoting cylinder 7. This sensor produces a first electric potential Vl proportional to the pivoting angle $\alpha1$, and supplied to an electronic calculator or computer block 46, on the one hand, and to an analog electronic corrector 47 interposed in the command circuit for the pivoting cylinder 7.

This correcting circuit 47 can be a comparator (pages 3 ff. of *Servomechanism Practice* op. cit.) receiving its actual value signal from the sensor 32 and a reference signal precalculated by the computer 46 from an output Ve1 thereof, the resulting error signal to be used to control the operator 7 in accordance with conventional analog servomechanism techniques.

Of course, before the signal from the sensor 32 is processed in the computer 46 to generate the output Ve1, it is digitalized by conventional analog-digital circuitry and, after processing, can be transformed into the analog voltage Ve1 by digital-analog circuitry within the computer (see chapter 16 of *Digital Computer Circuits & Concepts*, Reston Publishing Co., Inc. Prentice-Hall, Reston, Va., 1980).

If, of course, the signal Ve1 is a digital output, the input stage of the comparator 47 may be preceded by digital-analog circuitry. Such digital-analog and analog-digital circuitry is described at chapter 8, pages 2 through 44 of *Handbook of Telemetry and Remote Control,* McGraw-Hill Book Co., New York, 1967.

The other analog electronic correction circuits described below may be similarly constituted.

The second sensor 33 can be disposed at the pivot 10b between the arm 10 and the post 5 and is provided with a mechanical link represented at 48 with the member displaced by the levator cylinder 12. This sensor generates an electric potential V2 proportional to the elevational angle $\alpha 2$, this signal being supplied on the one hand to the electronic computer 46 and on the other hand to the electronic analogic corrector circuit 49 interposed in the command path for the levator cylinder 12.

The third sensor 34 is provided at the end of the arm member 10a to signal the angular displacement represented by the double-headed arrow 16 and is connected mechanically as represented at 50 with the member displaced by the hydraulic rotating motor 17. This sensor outputs two electric voltage signals V3', and V3" proportioned respectively to the sine and cosine of the angle $\alpha 3$ of rotation and delivered to the computer 46. The latter transforms these voltages to a linearly varying voltage V3 which is supplied to the analog electronic circuit 51 disposed in the control path to the hydraulic motor 17 as the actual value signal for comparison with a reference value deduced from the relationships given previously.

Figure 3:
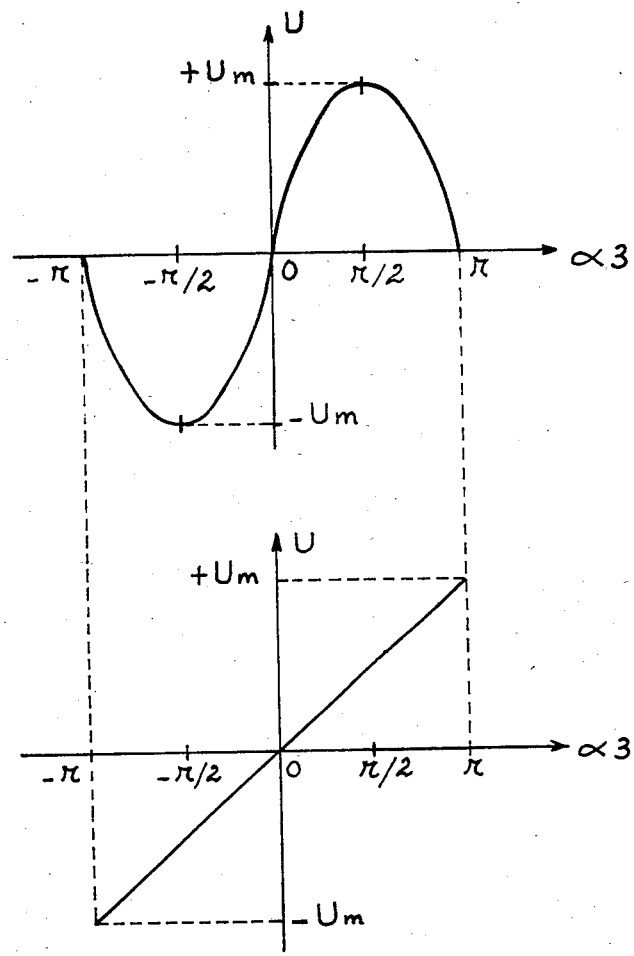
FIG. 3 is a diagram illustrating the conversion of a sinusoidally varying voltage produced by a sensor in the system of this invention to a linearly varying voltage utilizing the electronic processor of the invention.

FIG. 3 is a diagram showing this conversion by the electronic computer 46 (see chapter 15, pages 56 through 62 of *Handbook of Telemetry and Remote Control,* op. cit.) of the sinusoidally varying voltage U into the linear voltage. The maximum and minimum values of the sinusoidal signal are represented at +Um and −Um respectively and correspond to the maximum and minimum values +Um and −Um of the linear signal shown in the lower graph.

The fourth sensor 35, preferably disposed at the pivot axis A2 of the cradle on the plate 24, has a mechanical connection represented at 52 with the member displaced by the tilting cylinder 27. This sensor outputs a voltage V4 proportional to the tilting angle $\alpha 4$. This signal is supplied on the one hand to the computer 46 and, on the other hand, as the actual value signal to the electronic-analog correcting circuit 53 interposed in the command circuit for the tilting cylinder 47.

The inputs of the computer 46 are also connected to an electric switch 54 which can switch between levels to signal "manual" or "automatic" operating modes, for electric manipulators 55, 56, 57 and 58 for manual commands corresponding to the actuation of the pivoting operator 7, the levator operator 12, the rotary operator 17 and the tilting operator 27, on an all-or-none basis, and a firing program selector 59 which can represent any memory or input device for programming the apparatus to drill a particular pattern of holes in the wall. This memory may be in the form of a programmable read-only memory (PROM) programmed through the computer 46 or by means of another computer and plugged into this unit, a read-only memory or ROM which has been permanently programmed for a given drilling pattern, or a tape, disc or fixed storage which may be provided with operator-selection means or an appropriate interface for delivering a particular program of movements to the operators to bring about a selected pattern of drilling (see chapters 14 and 16 of *Digital Computer Circuits and Concepts,* op. cit.)

In its automatic operating mode, the assembly 1 is programmed starting from the selection of a firing plan so as to present the rail 2 successively in a number of positions each defined by predetermined values of the angles $\alpha 1$ and $\alpha 2$ for the drilling of respective holes.

The computer is programmed to solve the equations I and II given above and thereby determine the angles $\alpha 3$ and $\alpha 4$ corresponding to the angles $\alpha 1$ and $\alpha 2$ for a particular hole. Based upon these calculated angles $\alpha 3$ and $\alpha 4$, output signals Ve3 and Ve4 are provided as reference signals to the comparators 51 and 53, while the corresponding signals Ve1 and Ve2 are delivered to the comparators 47 and 49.

The analog comparators thus receive the reference inputs as well as the instantaneous value signals and achieve command or error signals W1, W2, W3 and W4 which are applied to the servovalves 36, 37, 38 and 39, respectively.

Naturally, by the appropriate choice of the equations relating the angles, it is possible to utilize a firing plan for drilling a multiplicity of parallel divergent or convergent bores in the face, the vehicle carrying the assembly being disposed along the axis of the tunnel. If this vehicle is located differently, positioning of the rail 2 can be effected along the axis manually at the start. The computer 46, based upon the new position, will redefine the angles $\alpha 1$ and $\alpha 2$ to obtain the relations given cosine $\alpha 3$ and $\alpha 4$. The firing plan is thus automatically adjusted and the rail 2 will be positioned parallel to the selected axis. The initial positioning of the rail 2 can be effected by the operator using an optical system carried by the vehicle to allow remote viewing of the position of the rail.

For manual operations, the operator need only shift the switch 54 to the manual position and set the position of the rail utilizing the manipulators 55, 56, 57 or 58. The resulting commands are compred to the voltages V1, V2, V3 and V4 delivered by the respective sensors 32, 33, 34 or 35 so that the correctors 47, 49, 51 or 53 will be effective to reposition the arm so that the rail is at the desired location.

The computer 46 can, of course, utilize a microprocessor as described in *Digital Circuits and Concepts,* op. cit. (see especially chapters 15 through 18).

I claim:

1. In an electrohydraulic control system for a support arm assembly of a subterranean drilling machine for automatic drilling of a number of bores relatively shifted in a predetermined pattern forming a firing plan which comprises:

a base support angularly displaceable about a substantially upright first axis;

a first hydraulic operator connected to said base support for angularly displacing same about said first axis through an angle $\alpha 1$;

an arm pivotally mounted on said base support and swingable thereon about a second axis substantially perpendicular to said first axis, said arm having a longitudinal third axis substantially perpendicular to said second axis;

a second hydraulic operator connected to said arm for angularly displacing same about said second axis through an angle $\alpha 2$;

a support member on said arm angularly displaceable about said third axis;

a third hydraulic operator on said arm connected to said member for angularly displacing said member about said third axis through an angle $\alpha 3$;

a tool-guiding rail pivotally mounted on said member for tilting movement about a fourth axis substantially perpendicular to said third axis; and a fourth hydraulic operator connected to said rail for tilting same about said fourth axis through an angle $\alpha 4$, the improvement wherein said system comprises in combination:

first, second, third and fourth sensors responsive respective to angular displacements $\alpha 1$, $\alpha 2$, $\alpha 3$ and $\alpha 4$ for generating respective electrical signals representing these angular displacements;

an electronic computer connected to each of said sensors individually for individually receiving said signals and processing same to provide:

(a) third and fourth output signals from said computer determining said angular displacements $\alpha 3$ and $\alpha 4$ to be generated by said third and fourth operators to maintain said rail parallel to itself upon positioning of said rail at a number of different locations for tool operations in response to first and second output signals corresponding to said angular displacements $\alpha 1$ and $\alpha 2$, and (b) generating respective command signals Ve1, Ve2, Ve3 and Ve4 for each of said first, second, third and fourth operators upon said initiation of a programmed sequence of movements of said rail controlled by said computer for successive operations of a drilling tool on said rail in successive locations thereof;

programming means for selecting from a number of such programmed sequences a predetermined sequence for applying a predetermined plan of locations for successive tool operations to said computer in accordance with said firing plan;

respective electronic correction circuits between the respective outputs of said computer and each of said operators for controlling same by comparing signals representing said angular displacements $\alpha 1$, $\alpha 2$, $\alpha 3$ and $\alpha 4$ and thus said actual positions generated by said operators with command signals Ve1, Ve2, Ve3 and Ve4 from said computer, whereby each of said operators is controlled at least in part in consideration of forces on said assembly at each location, said third sensor producing electrical signals V3' and V3" which are respectively proportional to the sine and cosine of the angle of rotation $\alpha 3$ of said support member about about said third axis through a full 360°, said signals V3' and V3" being supplied to said electronic computer, said electronic computer being programmed to transform said signals V3' and V3" into a linear signal V3 as a function of the angle $\alpha 3$ over a full 360° excursion of said angle $\alpha 3$; and means for applying said signal V3 to the electronic correction circuit of said third operator as the angle representing the actual position $\alpha 3$ generated by said third operator.

2. The improvement defined in claim 1 wherein each of said hydraulic operators is provided with an electrohydraulic control unit in the form of a servodistributor responsive to electrical signals from the respective correction circuits and hydraulically connected to the respective operator.

3. The improvement defined in claim 2, further comprising a manual/automatic switch connected to said electronic computer for switching the same between a manual mode of operation and an automatic mode of operation, said electronic computer being provided with manipulators for each of said operators providing respective inputs to said electronic computer in a manual operating mode of said manual/automatic switch.

4. The improvement defined in claim 3, further comprising respective all-or-none electric manipulators connected to said computer for individually actuating said operators therethrough.

* * * * *

UNITED STATES PATENT AND TRADEMARK OFFICE
CERTIFICATE OF CORRECTION

PATENT NO. : 4,601,000
DATED : July 15, 1986
INVENTOR(S) : Roger MONTABERT

It is certified that error appears in the above-identified patent and that said Letters Patent is hereby corrected as shown below: On the title page Item [73] Assignee's name should read:

-- Etablissements Montabert--

Signed and Sealed this

Seventeenth Day of February, 1987

Attest:

DONALD J. QUIGG

Attesting Officer

Commissioner of Patents and Trademarks